(12) United States Patent
Salgueiro et al.

(10) Patent No.: US 10,374,922 B2
(45) Date of Patent: Aug. 6, 2019

(54) IN-BAND, HEALTH-BASED ASSESSMENTS OF SERVICE FUNCTION PATHS

(71) Applicant: Cisco Technology, Inc., San Jose, CA (US)

(72) Inventors: Gonzalo Salgueiro, Raleigh, NC (US); Joseph Michael Clarke, Raleigh, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 15/051,809

(22) Filed: Feb. 24, 2016

(65) Prior Publication Data
US 2017/0244622 A1 Aug. 24, 2017

(51) Int. Cl.
*H04L 12/26* (2006.01)
*H04L 12/24* (2006.01)

(52) U.S. Cl.
CPC ...... *H04L 43/0817* (2013.01); *H04L 41/5035* (2013.01); *H04L 43/50* (2013.01)

(58) Field of Classification Search
CPC .................. H04L 43/0817; H04L 43/0847
See application file for complete search history.

(56) References Cited

U.S. PATENT DOCUMENTS

| | | | | |
|---|---|---|---|---|
| 8,250,654 B1* | 8/2012 | Kennedy | ................. | H04L 41/22 713/187 |
| 8,499,351 B1* | 7/2013 | Fredericksen | .......... | G06F 21/57 709/224 |
| 8,782,795 B1* | 7/2014 | Field | ..................... | H04L 63/205 726/25 |
| 8,874,685 B1* | 10/2014 | Hollis | ..................... | H04L 41/00 709/206 |
| 9,009,534 B2* | 4/2015 | Plate | ................... | G06F 11/3612 709/220 |
| 9,325,728 B1* | 4/2016 | Kennedy | ............. | H04L 63/1433 |
| 9,479,409 B2* | 10/2016 | Zhang | ................. | H04L 43/0811 |
| 9,547,570 B2* | 1/2017 | Chu | ........................ | G06F 11/263 |
| 9,634,951 B1* | 4/2017 | Hunt | ...................... | H04L 47/50 |
| 9,800,603 B1* | 10/2017 | Sidagni | .............. | H04L 63/1433 |
| 9,854,002 B1* | 12/2017 | Streete | .................... | H04L 63/10 |
| 9,860,152 B2* | 1/2018 | Xia | ......................... | H04L 43/12 |
| 9,929,945 B2* | 3/2018 | Schultz | ............... | H04L 43/0876 |
| 10,140,453 B1* | 11/2018 | Fridakis | ................ | G06F 21/577 |
| 2005/0198520 A1* | 9/2005 | Bardsley | .............. | G06F 21/577 713/189 |

(Continued)

OTHER PUBLICATIONS

Halpern et al. "Service Function Chaining (SFC) Architecture" Internet Engineering Task Force (IETF); pp. 1-32; Oct. 2015.

(Continued)

*Primary Examiner* — Blake J Rubin
(74) *Attorney, Agent, or Firm* — Behmke Innovation Group LLC; James Behmke; Stephen D. LeBarron

(57) ABSTRACT

In one embodiment, a device in a network places a path of a service function chain into a testing state. The device causes a self-assessment instruction to be propagated along the path while the path is in the testing state. The device analyzes self-assessment results from nodes along the path. The device adjusts a state of the path based on the analyzed self-assessment results.

12 Claims, 16 Drawing Sheets

(56) References Cited

U.S. PATENT DOCUMENTS

| | | | | |
|---|---|---|---|---|
| 2006/0015941 | A1* | 1/2006 | McKenna | G06F 21/577 726/23 |
| 2007/0169199 | A1* | 7/2007 | Quinnell | G06F 21/577 726/25 |
| 2007/0192867 | A1* | 8/2007 | Miliefsky | H04L 63/20 726/25 |
| 2010/0043066 | A1* | 2/2010 | Miliefsky | H04L 63/0263 726/9 |
| 2010/0257610 | A1* | 10/2010 | Hohl | G06F 21/51 726/25 |
| 2011/0179477 | A1* | 7/2011 | Starnes | G06F 21/52 726/9 |
| 2013/0219156 | A1* | 8/2013 | Sears | G06Q 10/06375 713/1 |
| 2013/0219493 | A1* | 8/2013 | Banzhof | H04L 63/1433 726/22 |
| 2013/0269029 | A1* | 10/2013 | Nakawatase | H04L 63/16 726/22 |
| 2013/0272305 | A1 | 10/2013 | Lefebvre et al. | |
| 2014/0331277 | A1* | 11/2014 | Frascadore | H04L 63/20 726/1 |
| 2014/0362682 | A1* | 12/2014 | Guichard | H04L 41/5038 370/221 |
| 2015/0092564 | A1* | 4/2015 | Aldrin | H04L 41/5038 370/241.1 |
| 2015/0106873 | A1* | 4/2015 | Marsh | G06F 21/577 726/1 |
| 2015/0195197 | A1 | 7/2015 | Yong et al. | |
| 2016/0119253 | A1* | 4/2016 | Kang | H04L 67/2814 370/228 |
| 2016/0182458 | A1* | 6/2016 | Shatzkamer | H04L 63/0428 713/168 |
| 2016/0226913 | A1* | 8/2016 | Sood | H04L 63/20 |
| 2016/0248860 | A1* | 8/2016 | Dunbar | H04L 67/16 |
| 2016/0294664 | A1* | 10/2016 | Manghirmalani | H04L 43/12 |
| 2016/0330111 | A1* | 11/2016 | Manghirmalani | H04L 43/028 |
| 2016/0352629 | A1* | 12/2016 | Wang | H04L 45/38 |
| 2016/0373474 | A1* | 12/2016 | Sood | H04L 63/1425 |
| 2017/0019334 | A1* | 1/2017 | Meng | H04L 12/6418 |
| 2017/0063783 | A1* | 3/2017 | Yong | H04L 67/2814 |
| 2017/0078176 | A1* | 3/2017 | Lakshmikantha | H04L 43/0852 |
| 2017/0078216 | A1* | 3/2017 | Adolph | H04L 12/4641 |
| 2017/0093658 | A1* | 3/2017 | Ryan | H04L 43/067 |
| 2017/0104679 | A1* | 4/2017 | Sunavala | G06F 9/45558 |
| 2017/0111209 | A1* | 4/2017 | Ward | H04L 41/0631 |
| 2017/0134538 | A1* | 5/2017 | Mahkonen | H04L 69/22 |
| 2017/0163531 | A1* | 6/2017 | Kumar | H04L 45/74 |
| 2017/0171236 | A1* | 6/2017 | Ouchn | H04L 63/1433 |
| 2017/0180218 | A1* | 6/2017 | Rasanen | H04L 41/5051 |
| 2017/0208037 | A1* | 7/2017 | Hay | H04L 63/0245 |
| 2017/0230252 | A1* | 8/2017 | Khasnabish | H04L 41/142 |
| 2017/0244625 | A1* | 8/2017 | Meng | H04L 43/10 |
| 2017/0302623 | A1* | 10/2017 | Bifulco | H04L 47/2441 |
| 2017/0346752 | A1* | 11/2017 | Krishnamurthy | H04L 45/306 |

OTHER PUBLICATIONS

Network function virtualization; https://en.wikipedia.org/wiki/Network_function_virtualization; pp. 1-7.

Quinn et al "Network Service Header draft-quinn-sfc-nsh-07.txt" Network Working Group; pp. 1-43; Feb. 24, 2015.

Halpern et al. "Service Function Chaining (SFC) Architecture draft-ietf-sfc-architecture-09" Network Working Group; pp. 1-29; Jun. 7, 2015.

Quinn et al "Network Service Header draft—ietf-sfc-nsh-01.txt" Network Working Group; Jul. 23, 2015; pp. 1-43.

Penno et al. "Services Function Chaining Traceroute draft enno-sfc-trace-03" SFC Netmod; pp. 1-9; Sep. 30, 2015.

* cited by examiner

IN-BAND, HEALTH-BASED ASSESSMENTS OF SERVICE FUNCTION PATHS

TECHNICAL FIELD

The present disclosure relates generally to computer networks, and, more particularly, to in-band, health-based assessments of service function paths.

BACKGROUND

Network Function Virtualization (NFV) is becoming a key driver and architecture in many large networks for both service providers and enterprises. Generally, NFV entails virtualizing certain network functions that would traditionally be implemented as separate network appliances. For example, NFV may virtualize the functions of firewalls, accelerators, intrusion detection and/or prevention devices, load balances, or the like.

NFV implementations often employ Service Function Chains (SFCs), to control which functions/services are applied to network traffic. For example, a particular SFC may dictate that traffic should be sent through a firewall service function, then through a network address translation (NAT) service function, and finally through a load balancer service function, before being sent on to its destination.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network places a path of a service function chain into a testing state. The device causes a self-assessment instruction to be propagated along the path while the path is in the testing state. The device analyzes self-assessment results from nodes along the path. The device adjusts a state of the path based on the analyzed self-assessment results.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
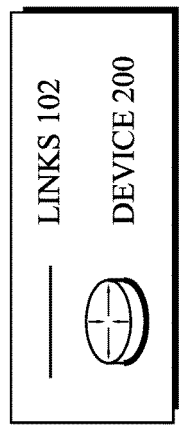
FIG. 1 illustrates an example communication network.
Figure 1:
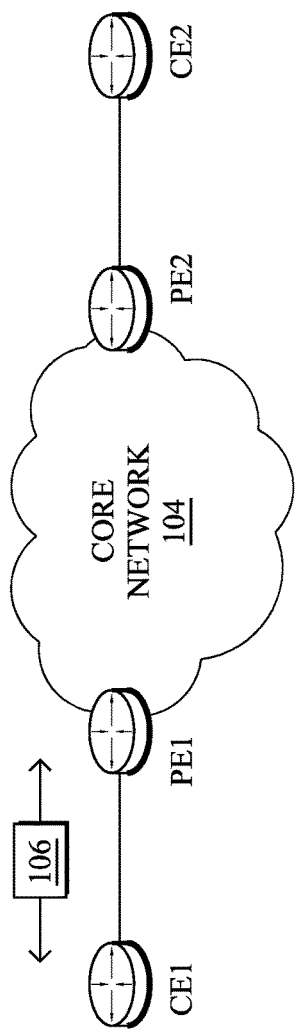

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network 104 may be a Multi-Protocol Label Switching (MPLS) network or, alternatively, any other form of network (e.g., Internet-based, etc.).

Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
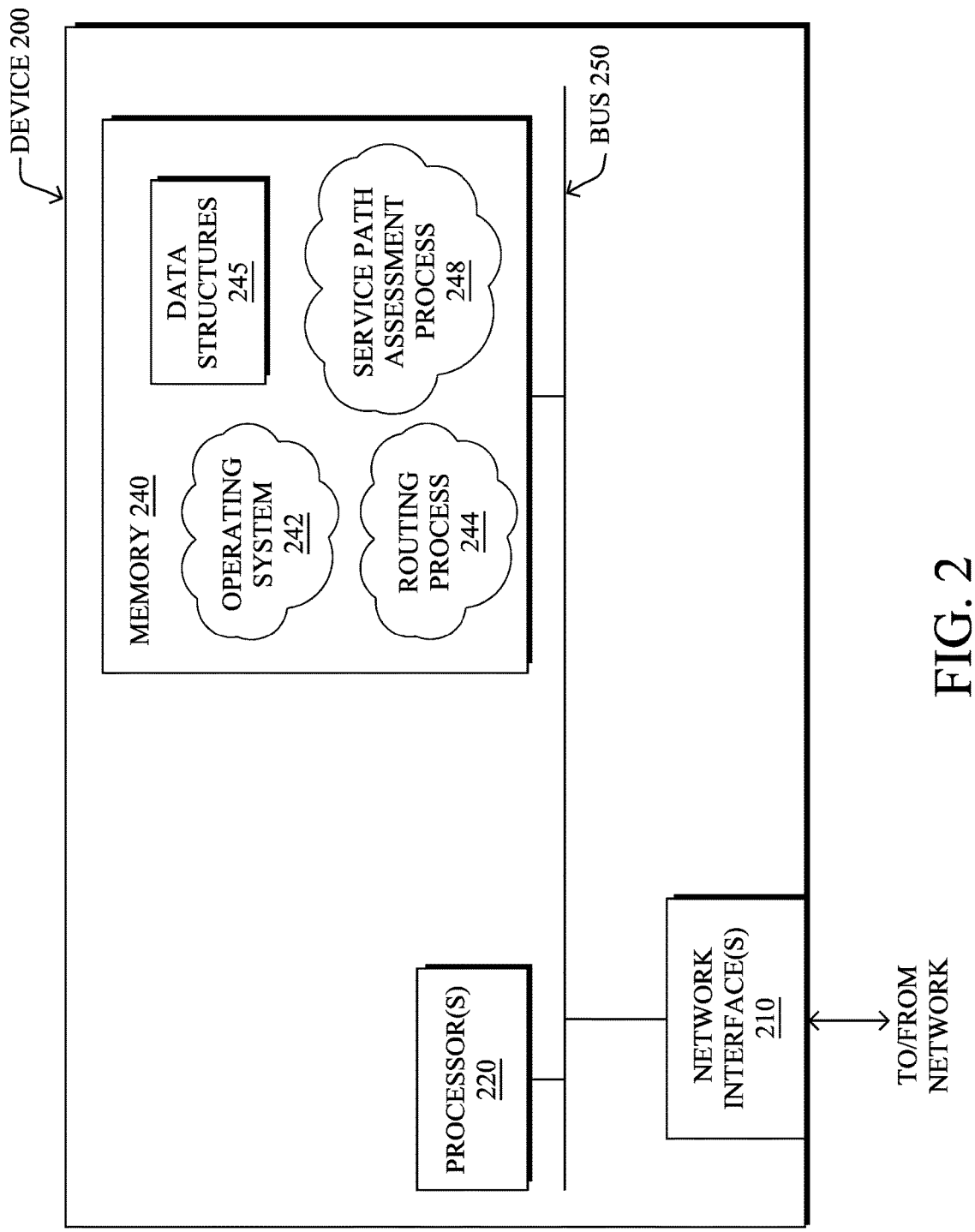
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a service path assessment process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In further embodiments, routing process 244 may be operable to implement the Service Function Chaining (SFC) architecture. For example, details regarding such an architecture can be found in the Internet Engineering Task Force (IETF) request for comments (RFC) 7665 entitled, "Service Function Chaining (SFC) Architecture" by J. Halpern et al., which is hereby incorporated by reference. In general, SFC facilitates the use of network services and provides for network location techniques to locate the device(s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which service functions a certain packet must be sent (e.g., which services are to perform their respective functions on the packet). The packet/frame may then be encapsulated, to include an indication of the specific SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF draft entitled, "Network Service Header," by P. Quinn et al., the contents of which are hereby incorporated by reference.

For a given SFC, there can be a variable number of SFPs and a variable number of Rendered Service Paths (RSPs). Related to the concept of an SFP, an RSP refers to the actual points in the network to which a packet travels. In some cases, an SFP may be constrained to such a degree that the SFP also identifies the actual locations. However, in many cases, an SFP is less constrained, as a service chain can exist as a group of abstract functions/services. Each of the SFPs/RSPs may include a number of specific instances of service functions, service function forwarders (SFFs), and/or proxies. For example, an RSP may comprise the following chain: Firewall_A---NAT_C---Load_Balancer_G.

As noted above, the NSH architecture provides the mechanisms for the construction of service chains in a network and the forwarding of traffic through those service chains using network service headers carried within the data plane. The network service headers are imposed on to the original packet/frame through classification. An outer encapsulation used for transport between individual services of the service chain is then pushed on to the packet/frame. Forwarding of packets/frames is achieved at the service plane layer using the NSH headers. Specifically, a Service Path Identifier (SPI) and Service Index (SI) are used for this purpose. A unique SPI is used to identify a given service path instantiation of a service chain, and the SI is initialized to the total number of services within the service chain, and decremented at each service hop as packets/frames traverse through the service path.

Figure 3A:
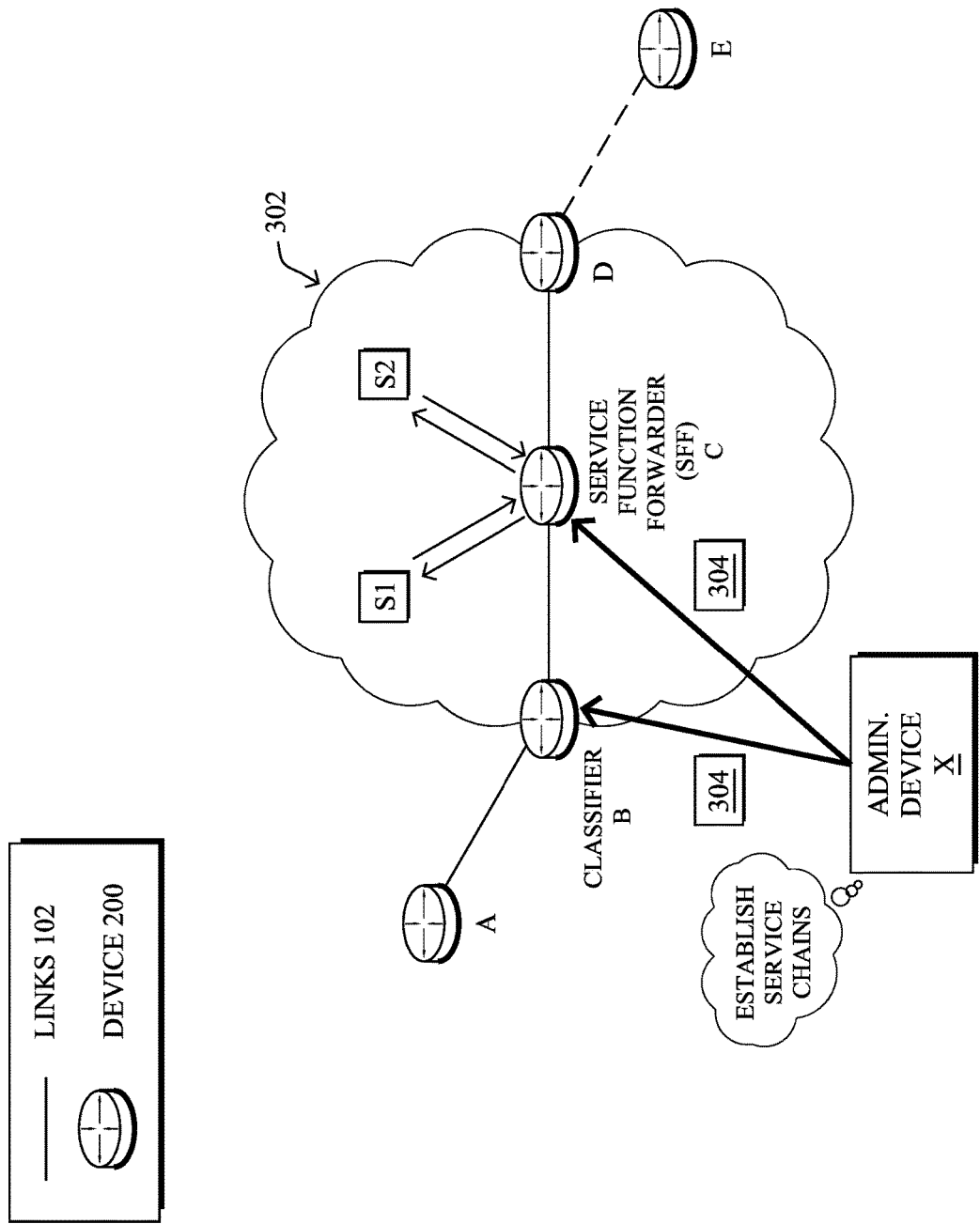
FIGS. 3A-3B illustrates an example of a service function chain (SFC) being configured.
Figure 3B:
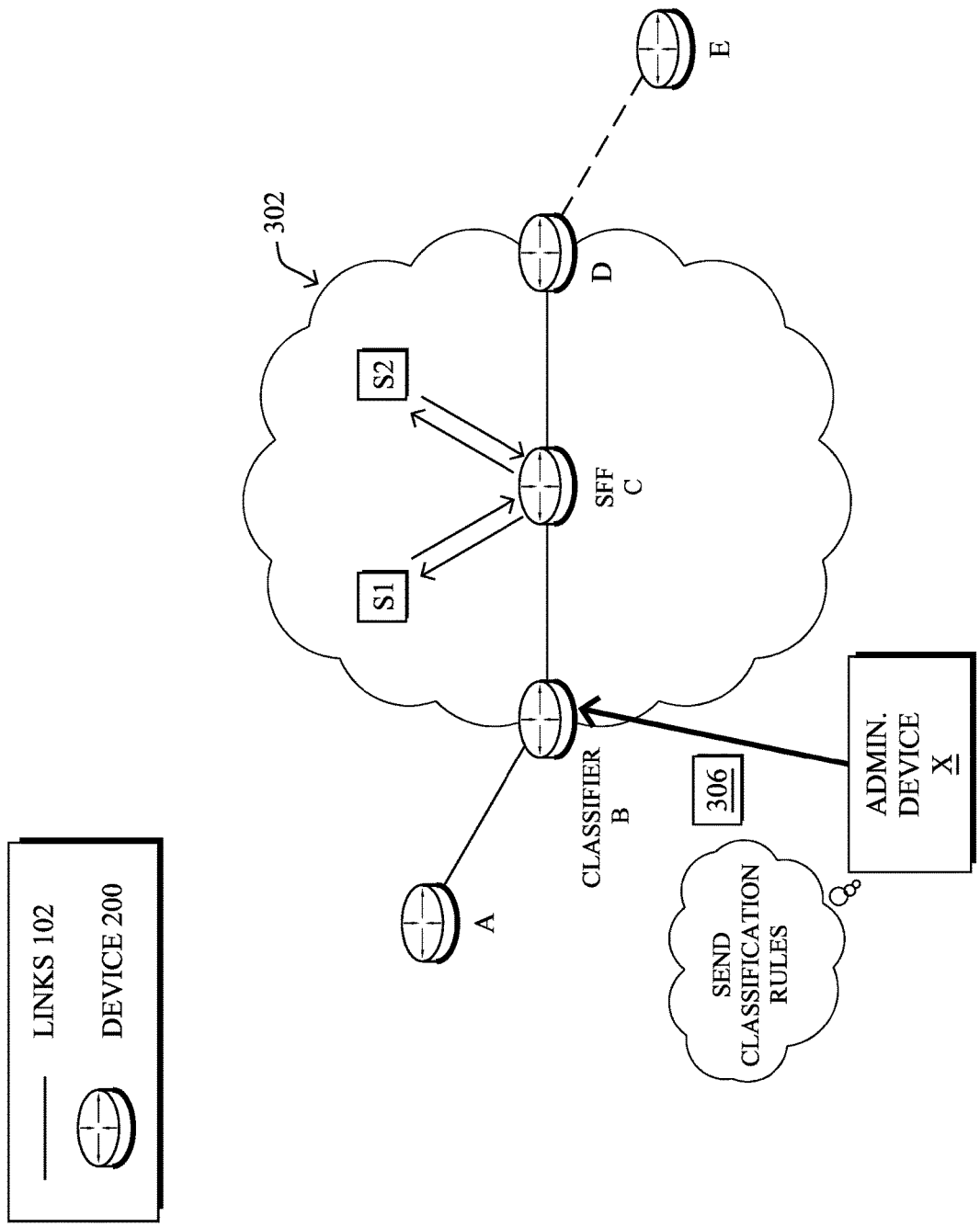

An example of an SFC being configured is shown in FIGS. 3A-3B. As shown in FIG. 3A, assume that nodes A-E exist along a path that traverses network portion 302. In particular, assume that node A is to send traffic to node E via the path shown. Further, assume that node B is an SFC classifier and that node C is an SFF that is configured to forward packets to a number of service functions, S1 and S2. For example, S1 may be a content filtering service and S2 may be a NAT service. In some cases, S1 and S2 may be provided by separate network devices. However, as service functions in an SFC can be virtualized, service functions S1 and S2 can also be implemented locally on node C, in other implementations. As would be appreciated, the nodes shown are presented in a simplified manner and the path between nodes A and E may comprise any number of intermediary nodes and service functions.

An administrator operating an administrative device/node X (e.g., a device 200) may define the service chains by sending instructions 304 to the devices/nodes associated with the chain. In some embodiments, the established service paths may be represented by their corresponding SPI and SI, to differentiate the different service paths. For example, one SFP may include service function S1, another SFP may include service function S2, a third SFP may include both service functions S1 and S2, etc. In various embodiments, Open Daylight (ODL), or another similar mechanism, may be used to configure an SFP.

As shown in FIG. 3B, classifier node B may also be programmed with classification rules 306 that are used by classifier node B to make SFC decisions based on the different types of user traffic that may be sent via node B. For example, one classification rule may require only HTTP traffic to pass through content filtering service function S1, whereas other types of traffic may not require this service. Similar to the SFP configurations, the administrator operating administrative device X may define classification rules 306 that are then sent to classifier node B.

Figure 4A:
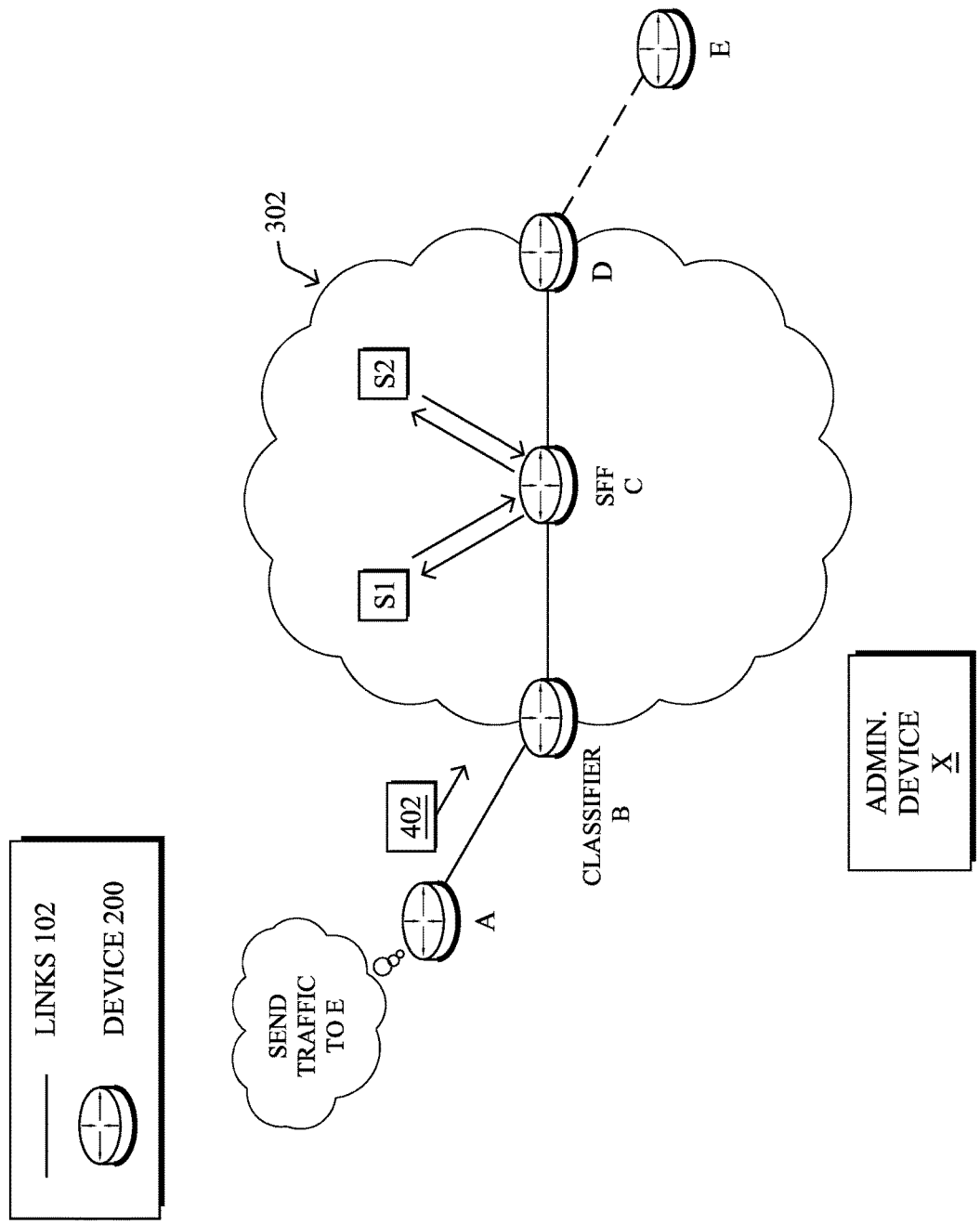
FIGS. 4A-4D illustrate examples of service function paths (SFPs) being used to convey traffic.

Referring now to FIGS. 4A-4D, examples of SFPs are shown. In FIG. 4A, assume that the SFPs have been established (e.g., as shown in FIGS. 3A-3B) and that node A sends user traffic 402 to node E via classifier node B. In such a case, any number of service functions (e.g., services functions S1, S2, etc.) may be performed on traffic 402, prior to delivery to its destination node E.

Figure 4B:
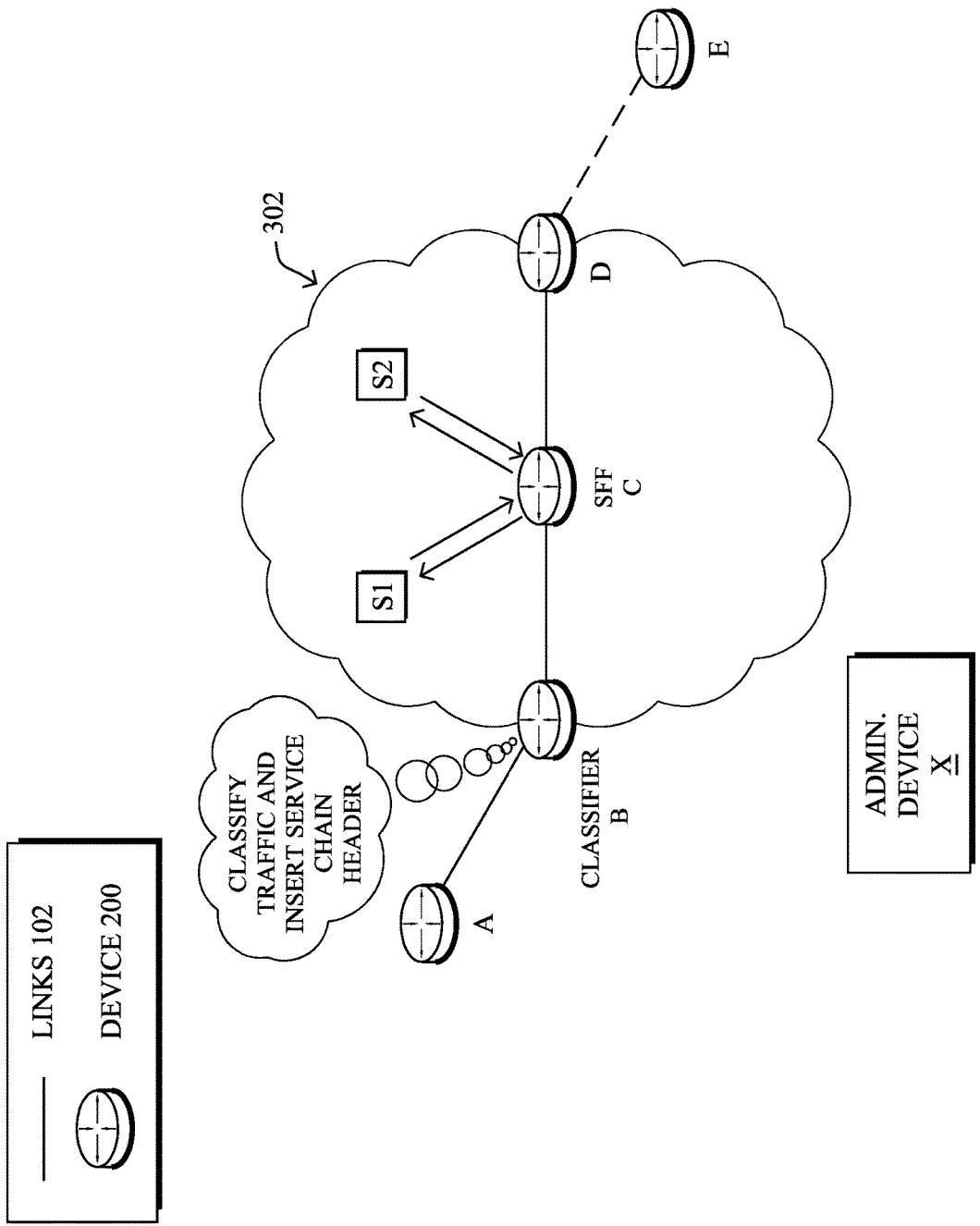

As shown in FIG. 4B, classifier node B may classify traffic 402 according to its programmed classification rules (e.g., rules 306). For example, classifier node B may classify traffic 402 by its type (e.g., the application associated with the traffic, etc.), its address information (e.g., the address and/or port of the source and/or destination device), or any other information that may be used to select a particular SFP for the traffic. Based on the classification, classifier node B may then construct a service chain header and encapsulate traffic 402 using the header. For example, classifier node B may select the SPI and SI associated with the classification and, in turn, may construct an NSH header for traffic 402 that indicates the selected values.

Figure 4C:
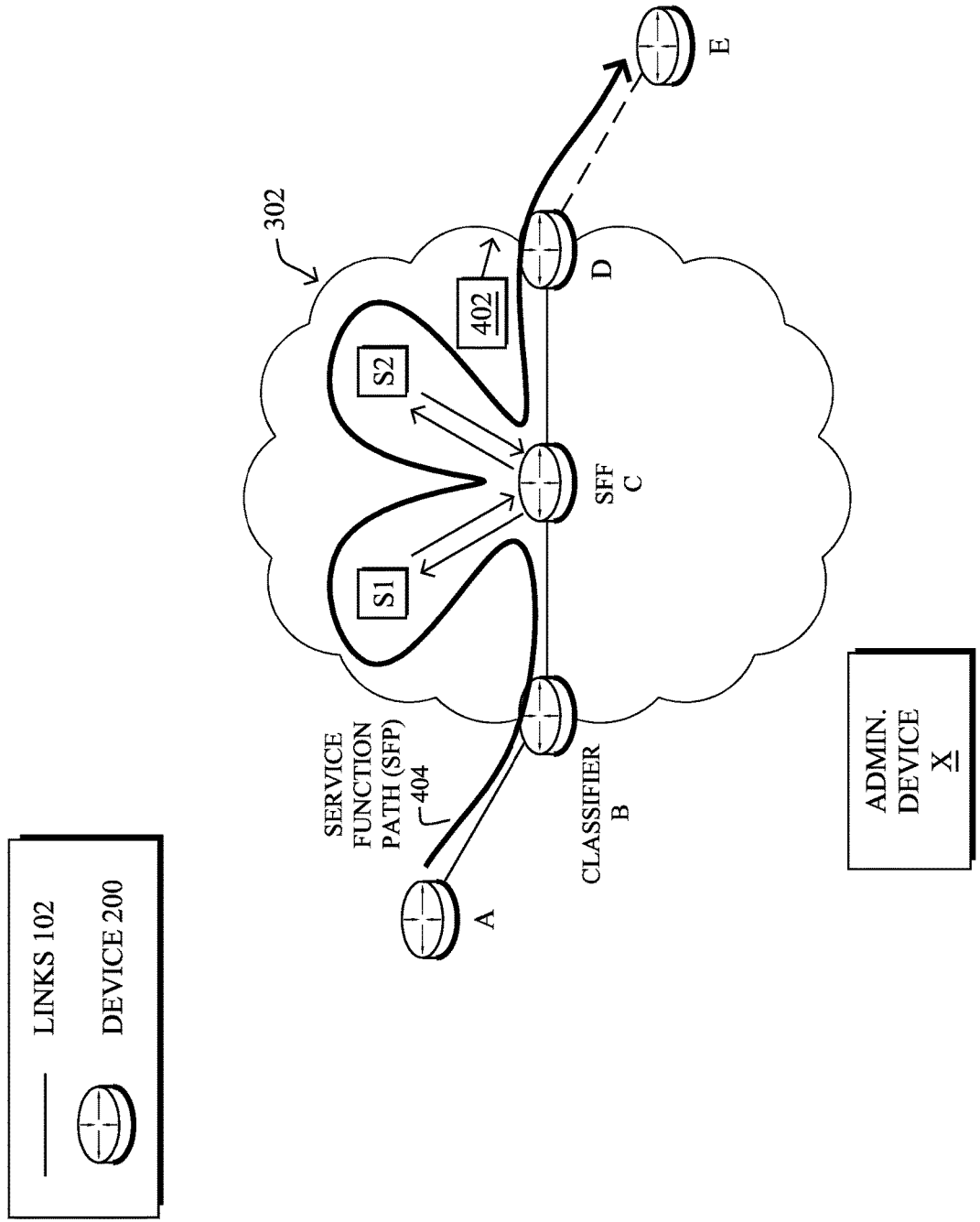

A first SFP 404 that may be selected by classifier B for traffic 402 is shown in FIG. 4C. In particular, the NSH header added to traffic 402 may indicate that traffic 402 should be sent to both service functions S1 and S2 for processing. Notably, in response to receiving an NSH-encapsulated packet, SFF C may determine that traffic 402 should be sent first to service function S1 for processing, then on to service function S2, before being forwarded towards its intended destination, node E.

Figure 4D:
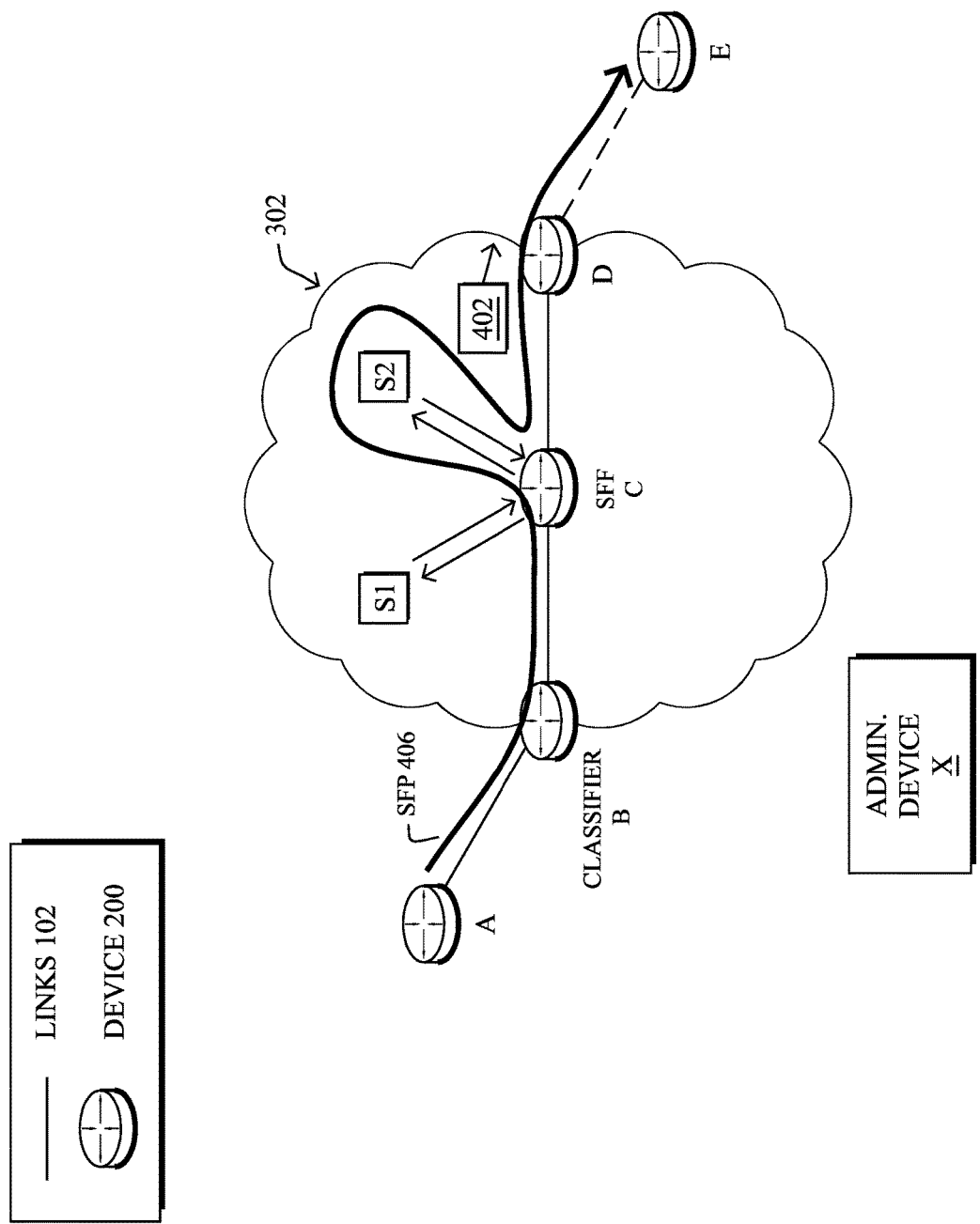

As shown in FIG. 4D, traffic 402 may traverse an alternate SFP 406, based on the NSH header inserted into traffic 402. For example, while SFP 404 includes both service functions S1 and S2, SFP 406 instead only includes service function S2. Thus, the classification of traffic 402 may affect which SFP, if any, the traffic will traverse before delivery to its destination.

Traditionally, ensuring the health and security of the devices along a traversed network path has been relatively straightforward. However, in SFC implementations, insight into an actual RSP may not be readily available. This is particularly true if the corresponding SFP is not constrained to the point that the SFP indicates the actual locations to be visited by the traffic. To this end, the IETF draft entitled "Services Function Chaining Traceroute," by Penno et al., proposes a traceroute mechanism whereby each node along an RSP returns information regarding the node back to the trace originator. However, even if the RSP nodes were to be identified, no mechanism exists to ensure the health and security of the SFP/RSP.

In-Band, Health-Based Assessments of Service Function Paths

The techniques herein generally allow for the assessment of SFP/RSP nodes from a health and security standpoint. In some aspects, a path testing state is introduced whereby only paths that are deemed healthy and/or secure are allowed to convey user traffic. In another aspect, to test whether a particular path is acceptable, inline executable assessment tests may be encoded within SFC operations, administration, and management (OAM) packets that are sent along the path, to test each node. These tests can be written in domain-specific test languages, such as, e.g., Open Vulnerability Assessment Language (OVAL). In a further aspect, techniques are described herein that allow the performance of action-driven health checks along a service function path. Notably, after initial setup of an SFP and before the SFP is cleared to pass user traffic, a process may be executed to test each service function for specific vulnerabilities (e.g., using OVAL commands), known bugs, etc., and/or to collect other specific information about a service function, such as operating system and state information.

Specifically, according to one or more embodiments of the disclosure as described in detail below, a device in a network places a path of a service function chain into a testing state. The device causes a self-assessment instruction to be propagated along the path while the path is in the testing state. The device analyzes self-assessment results from nodes along the path. The device adjusts a state of the path based on the analyzed self-assessment results.

Illustratively, the techniques described herein may be performed by hardware, software, and/or firmware, such as in accordance with the service path assessment process 248, which may contain computer executable instructions executed by the processor 220 (or independent processor of interfaces 210) to perform functions relating to the techniques described herein, e.g., in conjunction with routing process. For example, the techniques herein may be treated as extensions to conventional protocols, such as the various SFC protocols and, as such, may be processed by similar components understood in the art that execute those protocols, accordingly.

Figure 5:
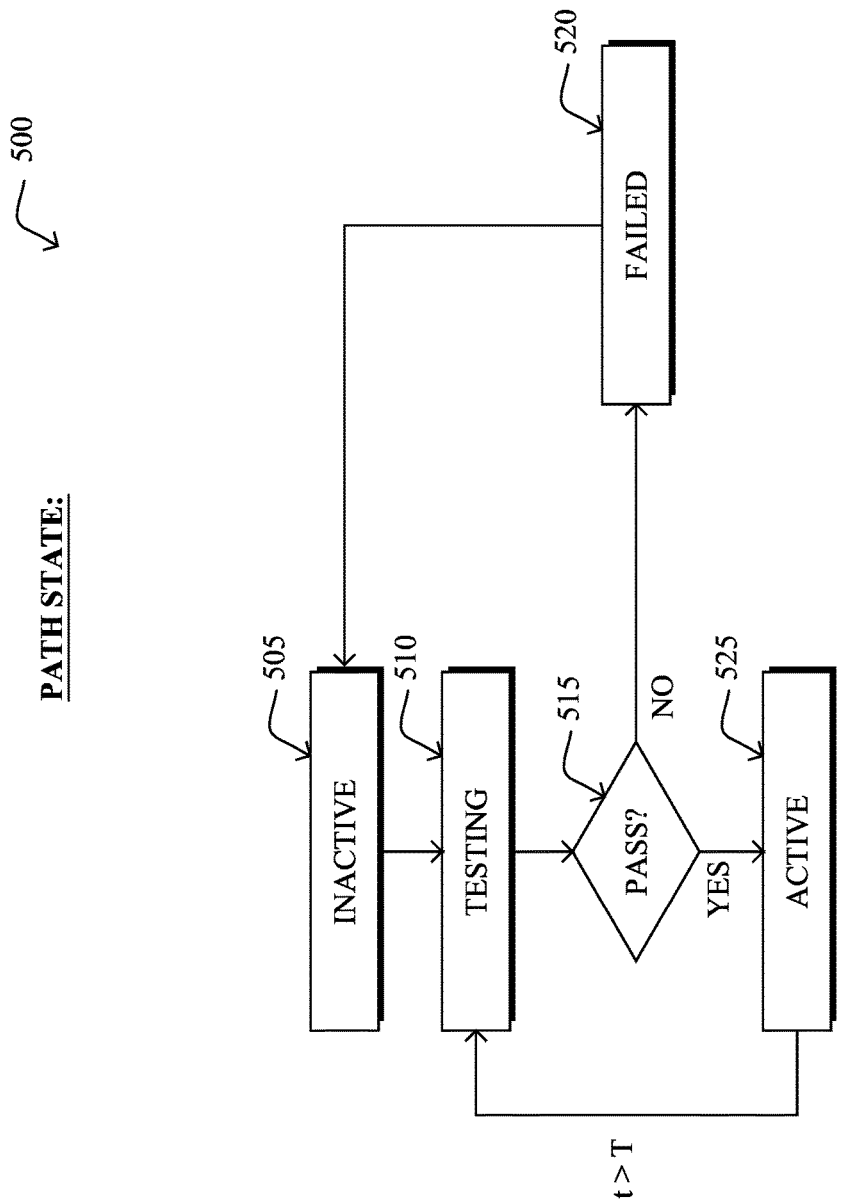
FIG. 5 illustrates a state machine for an SFC path.

Operationally, FIG. 5 illustrates an example state machine diagram 500 for an SFC path (e.g., an SFP/RSP), according to various embodiments. As shown, a given path may be placed initially in an inactive state 505, such as during or directly after configuration of the path. While in this state, user traffic may not be sent down the path until the path has been cleared for use.

After establishment of an SFP/RSP, the path may be moved into a testing state 510, to test the health of the nodes along the path. While in this state, the path may still be prevented from conveying user traffic. However, assessment instructions may still be conveyed to the path nodes, to determine whether the path is healthy and/or secure. In some embodiments, the path may be tested by generating and sending an OAM packet along the path, while the path is in the 'testing' state. Such a packet may include any number of health check instructions in its payload. For example, these health checks could include tests for known security defects, software/hardware bugs, field notices, etc. In response to receiving the OAM packet, a node along the tested path may perform the requested tests and return the results for analysis. In other embodiments, the results may comprise requested information about the status of the node, such as the software or patches installed at the node, etc., allowing the supervisory device to make the final assessment of the node.

Based on the analysis of the testing results, the supervisory device may determine whether or not the path is cleared for use. In particular, if the test fails, the device may place the path into a failed state 520. Subsequently, the path may be transitioned from failed state 525 back to inactive state 505. In one embodiment, a timer may also be set based on the state transition back to inactive state 505, allowing the path to be retested at a later time. In other embodiments, the supervisory device may generate an alert while in failed state 520, thereby informing an administrator of the failure.

If the analysis of the test results indicates that the path has passed all relevant tests, the state of the path may be transitioned into an active state 525. In active state 525, the path may be used to convey user traffic according to its configuration and classification rules. In various embodiments, an active path may be tested periodically, on demand, or in response to a detected network event. For example, as shown in FIG. 5, the supervisory device may place the path back into testing state 510 if the amount of time that the path was in active state 525 exceeds a time threshold, T. In other cases, the state of the path may be reverted back to testing state 510 to test whether the path exhibits a recently discovered type of vulnerability.

Figure 6:
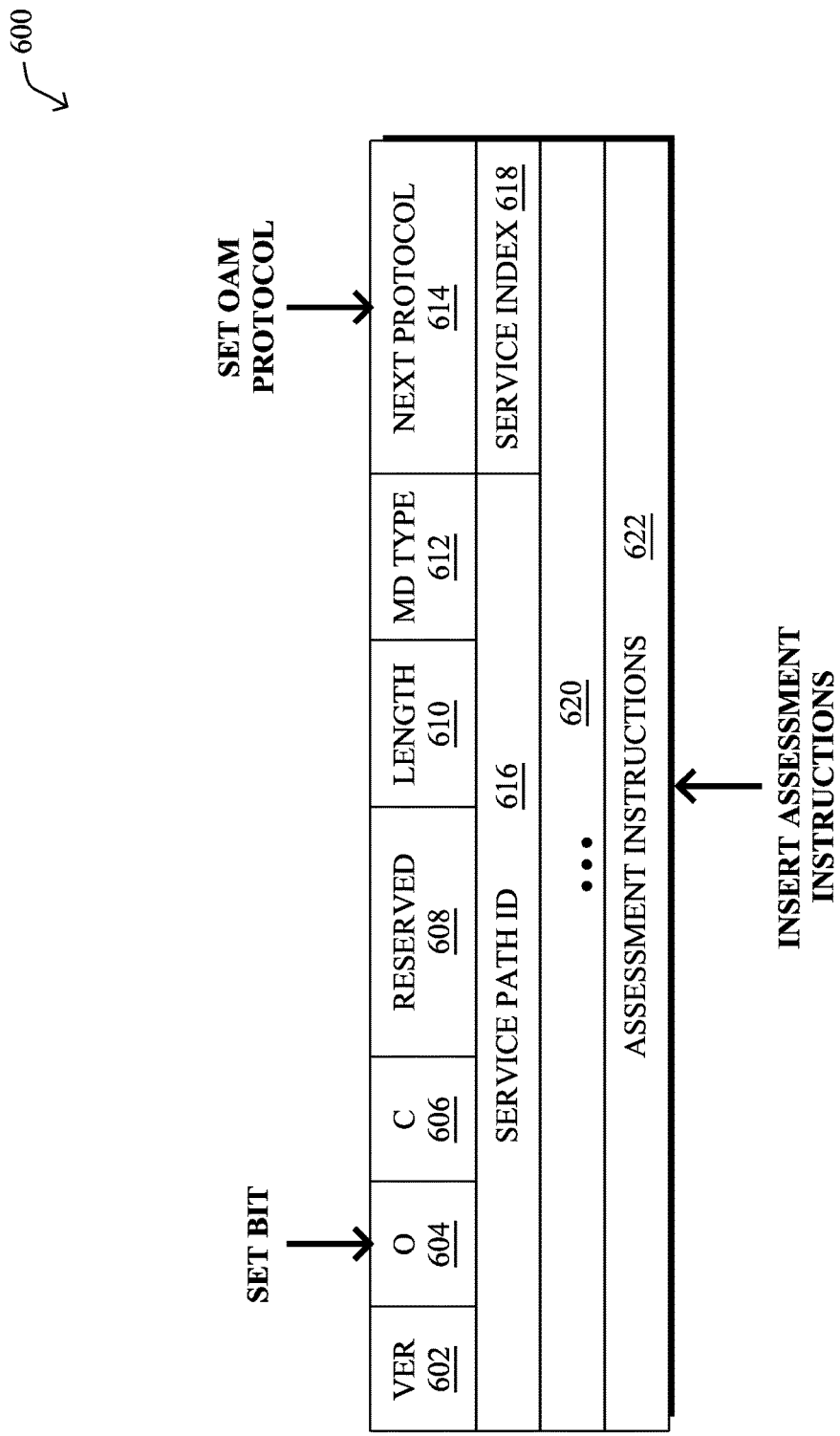
FIG. 6 illustrates an example self-assessment instruction for nodes along a path of an SFC.

FIG. 6 illustrates an example self-assessment instruction for nodes along a path of an SFC, according to various embodiments. As shown, an OAM packet 600 may be encapsulated using an NSH header or another header operable to route packet 600 along a given SFP/RSP. For example, in some embodiments, OAM packet 600 may be an NSH-encapsulated packet that includes an OVAL-based assessment instruction in its payload. In some embodiments, packet 600 may be further encapsulated, according to the various routing protocols available.

As shown, the header of packet 600 may include a base header that includes bits/fields 602-614. Particularly, version field 602 may indicate the NSH version and may be set to 0×0, if the initial version of NSH is used. O bit 604 may indicate whether or not packet 600 is an OAM packet. C bit 606 may indicate whether packet 600 includes a critical type-length-value (TLV). Packet 600 may further include any number of reserved bits 608 that may be used, e.g., in subsequent versions of NSH. Length field 610 may be a four byte word that indicates the total header length, including any optional TLVs used. MD Type field 612 may be set to indicate whether the header includes fixed-length context headers or, alternatively, variable length context information. Finally, the header of packet 600 may include a next protocol field 614 that indicates the type of the protocol originating the packet.

Packet 600 may also include service path header fields 616-618. Service Path ID (SPI) field 616 may uniquely identify a service path. For example, SPI field 616 may include 24 bits that can be set to represent a particular service path. Service index (SI) field 618 may indicate the number of services along the path indicated by field 616 that still need to process packet 600. As packet 600 is processed during transit by a service function, SI field 618 may be decremented, accordingly.

Packet 600 may further include any number of context header fields 620. In accordance with NSH, the number and size of fields 620 may be a function of the value set in MD Type field 612. Notably, if MD Type field 612 is set to be 0×1, context header fields 620 may comprise four mandatory context headers, each having four bytes. However, if MD Type field 612 is set to be 0×2, packet 600 may include zero or more context header fields 620.

Packet 600 may also include assessment instructions in its payload 622 that cause a receiving path node to perform a self-assessment. Such an assessment may analyze the health or security posture of the executing node. The checks themselves may be expressed in an encoding and language that the RSP nodes can understand.

According to various embodiments, packet 600 may be generated for any SFP/RSP that is currently in the 'testing' state as follows:

1.) O bit 604 may be set in packet 600, to indicate that packet 600 is an OAM packet;

2.) Next protocol field 614 may be set to indicate the specific OAM protocol used (e.g., OVAL, etc.); and 3.) Assessment instructions may be added to the payload 622 of packet 600, to cause the receiving nodes to perform security and/or health self-assessments. For example, the following represents a comprehensive set of security assessment instructions that may be included in payload 622 of packet 600:

```
[{"OVAL":' <?xml version="1.0"?>
   <oval_definitions xmlns:xsi="http://www.w3.org/2001/XMLSchema-instance"
xmlns:oval="http://oval.mitre.org/XMLSchema/oval-common-5"
xmlns="http://oval.mitre.org/XMLSchema/oval-definitions-5"
xsi:schemaLocation="http://oval.mitre.org/XMLSchema/oval-definitions-5 oval-
definitions-schema.xsd http://oval.mitre.org/XMLSchema/oval-common-5 oval-
common-schema.xsd http://oval.mitre.org/XMLSchema/oval-definitions-5#ios ios-
definitions-schema.xsd">
      <definitions>
         <definition class="vulnerability" id="oval:cisco.oval:def:13" version="1">
            <metadata>
               <title>
cisco-sa-20120328-ike-CVE-2012-0381 </title>
               <affected family="ios">
                  <platform>
Cisco IOS </platform>
               </affected>
               <reference source="CVE" ref_id="CVE-2012-0381" ref_url=""/>
               <reference source="Vendor Advisory" ref_id="cisco-sa-20120328-ike"
ref_url="http://tools.cisco.com/security/center/content/CiscoSecurityAdvisory/cisco-sa-
20120328-ike"/>
               <description/>
            </metadata>
            <criteria operator="AND">
               <criterion test_ref="oval:cisco.oval:tst:22" comment="ike commands config
tests"/>
               <criterion test_ref="oval:cisco.oval:tst:14" comment="IOS Versions for
CSCts38429"/>
            </criteria>
         </definition>
      </definitions>
      <tests>
         <line_test xmlns="http://oval.mitre.org/XMLSchema/oval-definitions-5#ios"
state_operator="OR" comment="ike commands config tests" check="at least one"
id="oval:cisco.oval:tst:22" version="1">
```

```
        <object object_ref="oval:cisco.oval:obj:1"/>
        <state state_ref="oval:cisco.oval:ste:25209"/>
        <state state_ref="oval:cisco.oval:ste:25210"/>
    </line_test>
    <version55_test xmlns="http://oval.mitre.org/XMLSchema/oval-definitions-5#ios"
state_operator="OR" comment="IOS Versions for CSCts38429" check="at least one"
id="oval:cisco.oval:tst:14" version="1">
        <object object_ref="oval:org.mitre.oval:obj:6804"/>
        <state state_ref="oval:cisco.oval:ste:3473"/>
    </version55_test>
</tests>
<objects>
    <line_object xmlns="http://oval.mitre.org/XMLSchema/oval-definitions-5#ios"
id="oval:cisco.oval:obj:1" version="1">
        <show_subcommand>
show running-config </show_subcommand>
    </line_object>
    <version55_object xmlns="http://oval.mitre.org/XMLSchema/oval-definitions-5#ios"
id="oval:org.mitre.oval:obj:6804" version="1"/>
</objects>
<states>
    <line_state xmlns="http://oval.mitre.org/XMLSchema/oval-definitions-5#ios"
id="oval:cisco.oval:ste:25209" version="1">
        <show_subcommand>
show running-config </show_subcommand>
        <config_line operation="pattern match">
\n\s*crypto map \s+ </config_line>
    </line_state>
    <line_state xmlns="http://oval.mitre.org/XMLSchema/oval-definitions-5#ios"
id":cisco.oval:ste:25210" version="1">
        <show_subcommand>
show running-config </show_subcommand>
        <config_line operation="pattern match">
\n\s*tunnel protection ipsec \s+ </config_line>
    </line_state>
    <version55_state xmlns="http://oval.mitre.org/XMLSchema/oval-definitions-5#ios"
id="oval:cisco.oval:ste:3473" version="1">
        <version_string>
12.1(3a)T5 </version_string>
    </version55_state>
</states>
</oval_definitions>
'}]
```

Due to the nature of some of the possible test domain-specific languages, OAM packets 600 may be relatively large. To mitigate that, compression or binary encoding can be used, in various embodiments, to compress the assessment instructions. For example, the text of the instruction(s) can be compressed using Lempel-Ziv-Welch (LZW) compression or using encoding such as Efficient XML Interchange or the like.

Figure 7A:
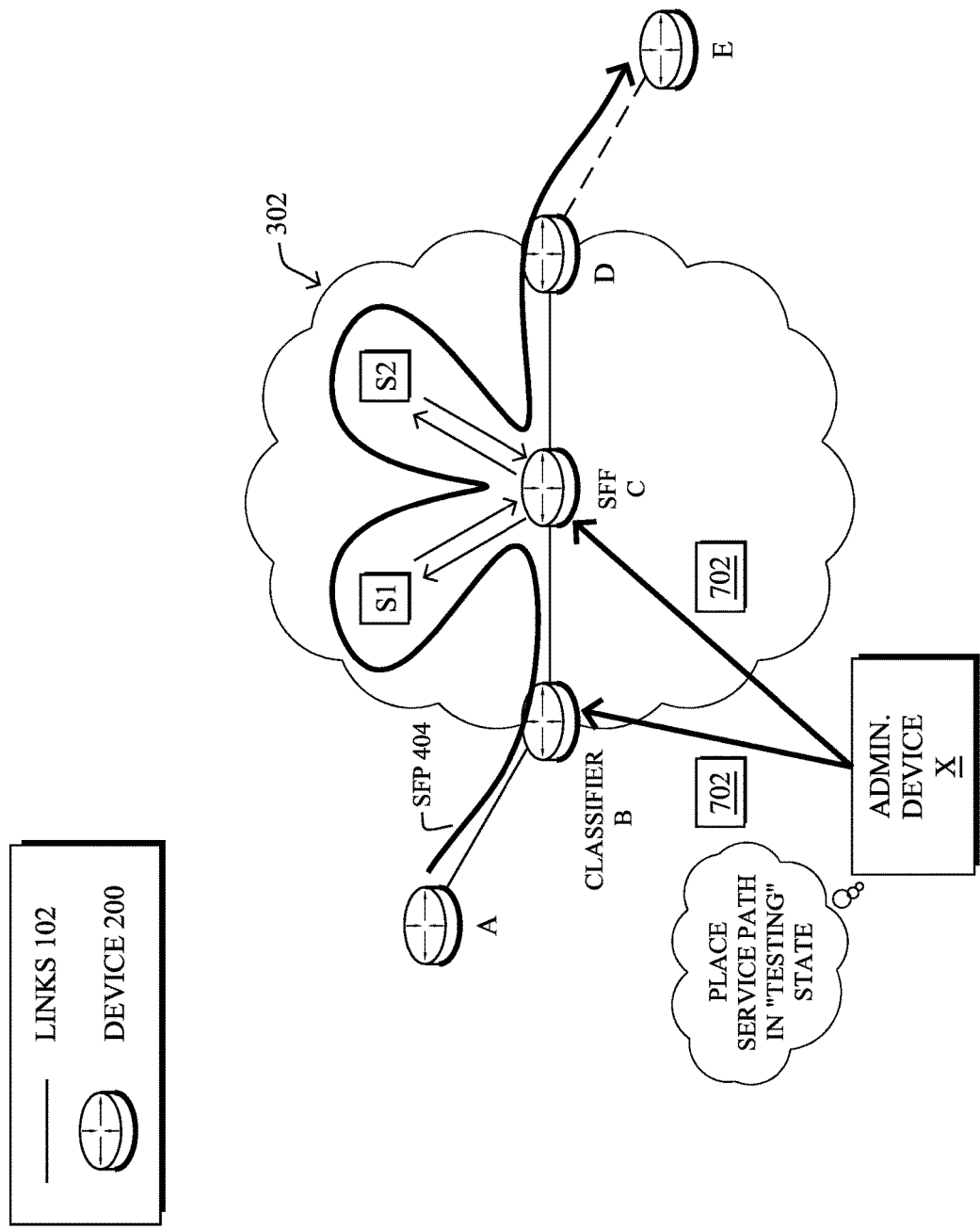
FIGS. 7A-7E illustrate examples of the state of an SFC path being adjusted.

FIGS. 7A-7E illustrate examples of the state of an SFC path being adjusted, according to various embodiments. As shown in FIG. 7A, assume that SFP 404 has already been configured in the network (e.g., as shown in FIGS. 3A-3B). To initiate testing of SFP 404, commands 702 may be sent to one or more of the devices/nodes along SFP 404, thereby placing SFP 404 into the 'testing' state. While in this state, SFP 404 may be ineligible to convey user traffic until the test is complete. As noted previously, SFP 404 may be placed into the 'testing' state after configuration (e.g., by transitioning from an initial 'inactive' state) or from an 'active' state in which SFP 404 is available for use.

Figure 7B:
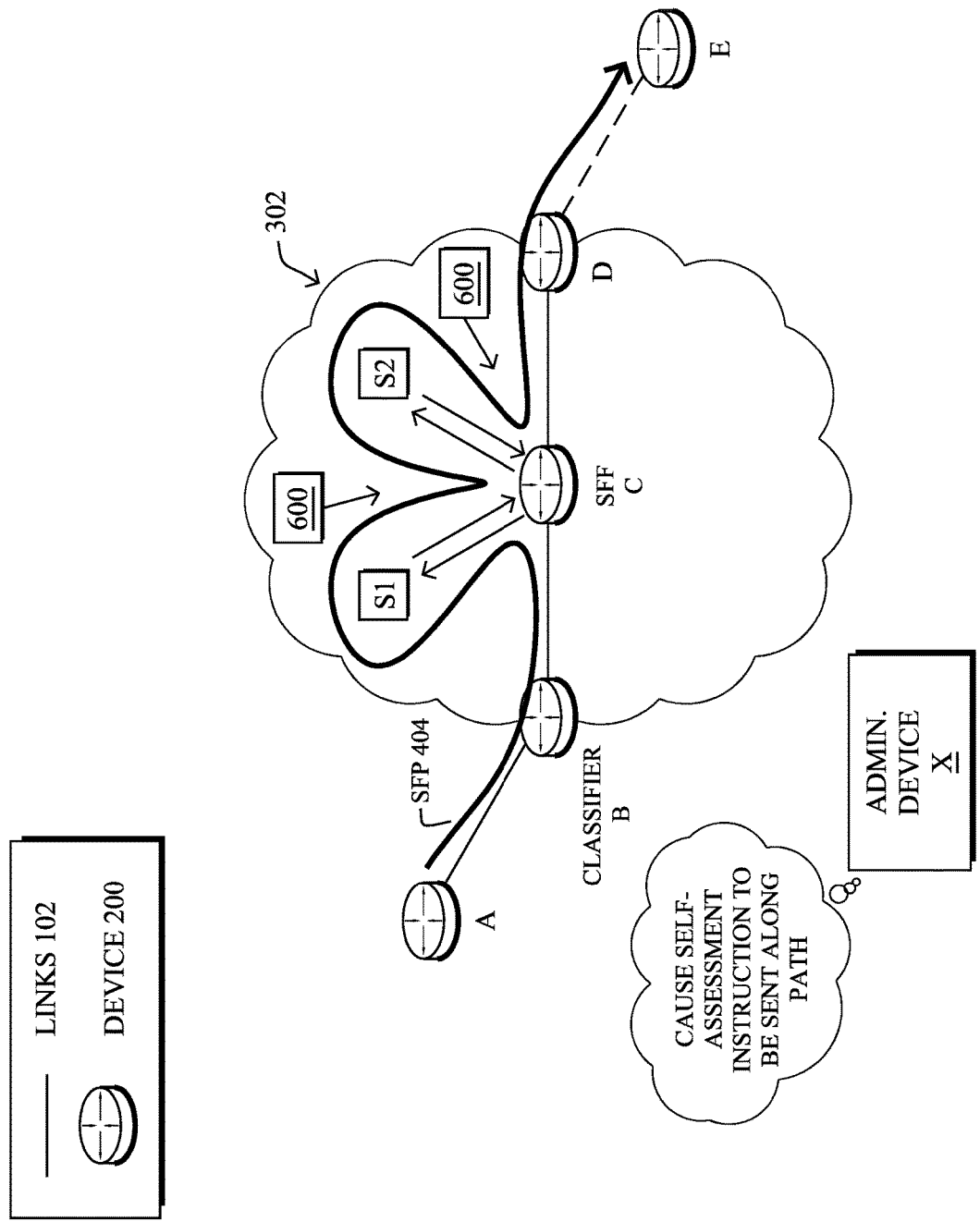

As shown in FIG. 7B, once SFP 404 has been placed into the 'testing' state, encapsulated OAM packets, such as OAM packet 600, may be propagated down SFP 404. For example, in some embodiments, instructions 702 to place SFP 404 into a 'testing' state may also include an indication of the particular assessment instructions to be sent down the path. In other embodiments, the assessment instructions may be sent separately, to initiate the sending of OAM packet 600 down SFP 404.

Figure 7C:
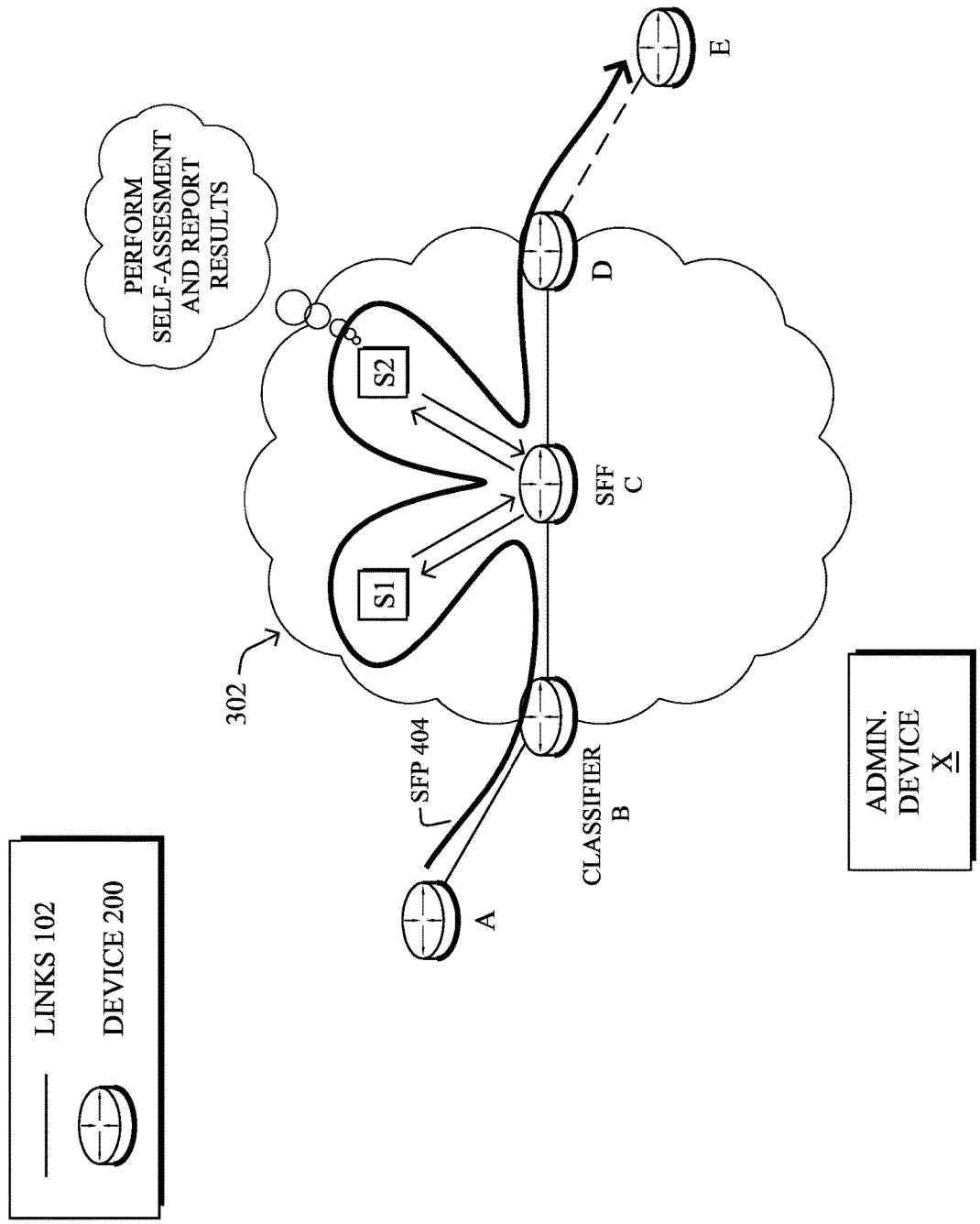

In FIG. 7C, any node along SFP 404 that receives OAM packet 600 may determine whether O bit 604 indicates that packet 600 is an OAM packet. If so, the node may examine the next protocol field 614, to determine the type of OAM check to be performed. For example, the node may determine that that the OAM message type in field 616 indicates that the assessment is a OVAL-based heath assessment. The node may then execute the self-assessment instructions in payload 622 of packet 600. In various embodiments, the self-assessment may be a health assessment, a security assessment, or an instruction to report the configuration of the node (e.g., OS version, patch version, etc.).

Figure 7D:
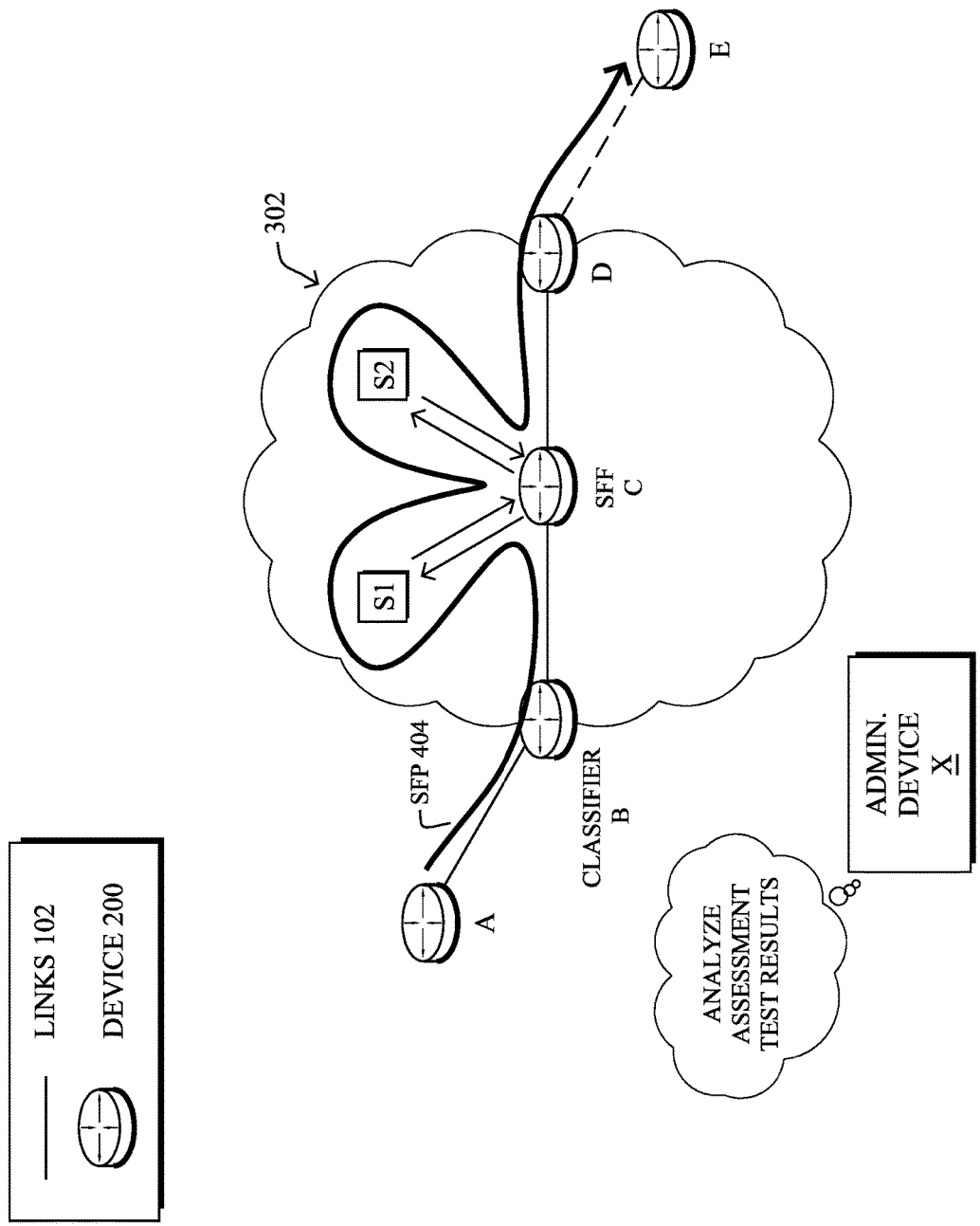

As shown in FIG. 7D, the supervisory device (e.g., administrative device X) may analyze the reported assessment results from the nodes along SFP 404, to determine a state adjustment for the path. For example, each node along SFP 404 may evaluate OVAL-based assessment tests and return a result based on its vulnerability status. Those nodes that are vulnerable may return a FAIL response to the supervisory device, whereas those nodes that are not vulnerable would return a PASS response. For tests that a node cannot understand (e.g., the node may not have an interpreter for a specific test language), the node may return an UNKNOWN response. In some cases, it may be up to the administrator to determine if an UNKNOWN response from a node represents a healthy or unhealthy RSP. In other cases, the handling of an UNKNOWN response may be a function of the classification rules associated with the path. For example, the path may be acceptable for lower value traffic, but unacceptable for higher value traffic, if a node along the path returns an UNKNOWN response.

Figure 7E:
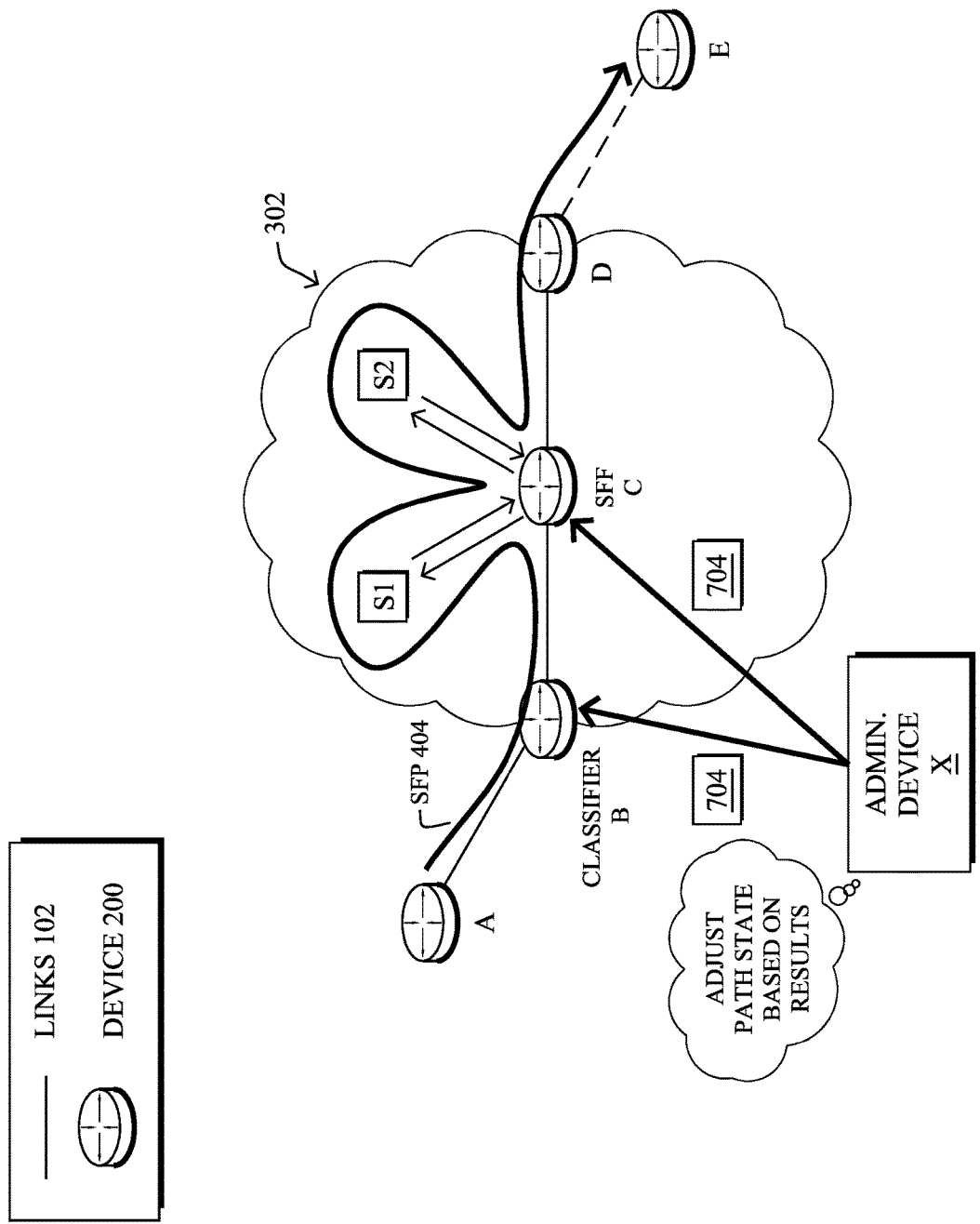

As shown in FIG. 7E, the supervisory device may adjust the state of the path based on the analysis of the self-assessment results. For example, if each node along SFP 404 returned a PASS response, the supervisory device may determine that SFP 404 is cleared for use by user traffic. Accordingly, instructions 704 may be sent to one or more of the nodes along SFP 404, to change the state of the path from 'testing' to 'active.' However, if the path is deemed to be unhealthy, unsecure, or otherwise unfit for user traffic, instructions 704 may cause the path to revert to its 'inactive' state. The path may stay in this state until, for example, the failing node is patched or otherwise repaired. In some embodiments, SFP 404 may also be reverted to the 'testing' state at any given time (e.g., during a maintenance window, during a lull in traffic, etc.), to ensure that the path is still healthy in view of any recently discovered vulnerabilities or operational issues.

Figure 8:
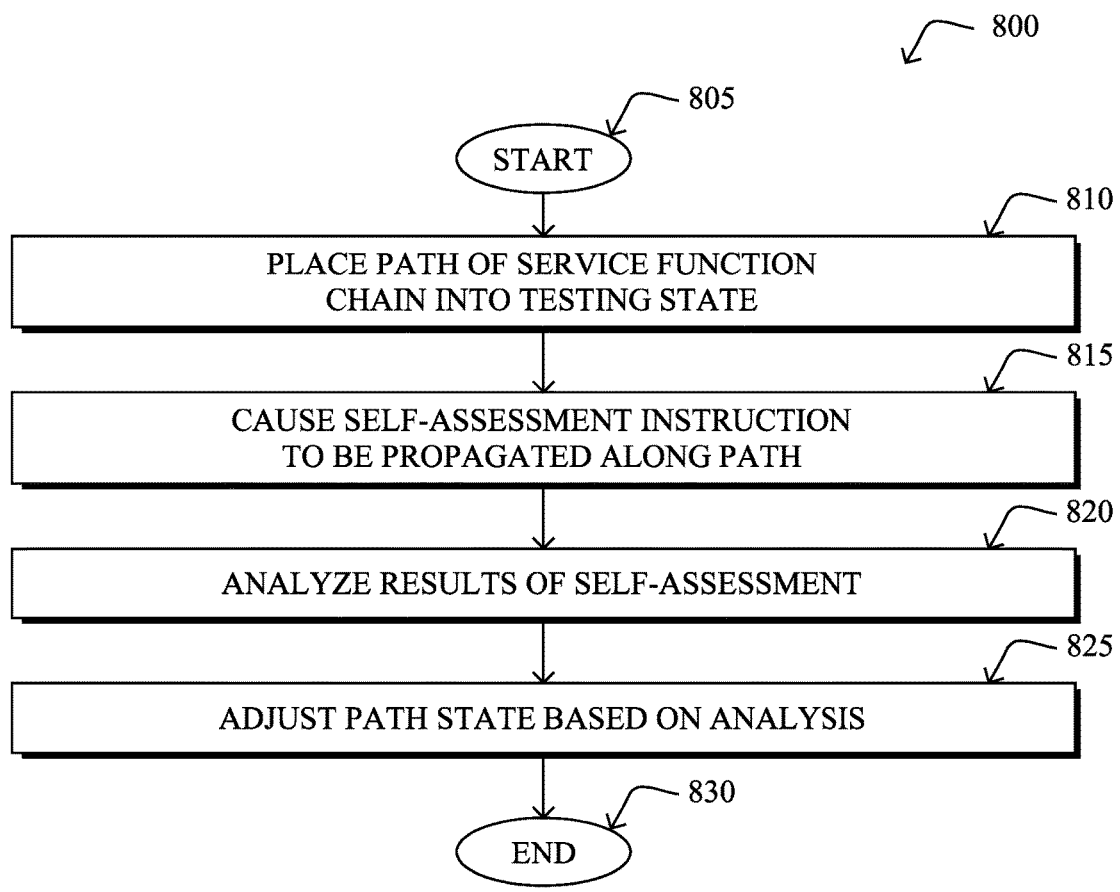
FIG. 8 illustrates an example simplified procedure for performing a state-based assessment of a service function path.

Referring now to FIG. 8, an example simplified procedure for performing a state-based assessment of a service function path is shown, according to various embodiments. The procedure 800 may be performed by any device in a network by executing stored machine instructions such as, e.g., specialized networking hardware that supervises the state of an SFC path. Procedure 800 may begin at step 805 and continue on to step 810 where, as described in greater detail above, the device may cause an SFC path (e.g., and SFP/RSP) to enter into a testing state. While in such a state, the path may be prevented from being used to convey user traffic during testing.

At step 815, as detailed above, the device may cause a self-assessment instruction to be propagated along the path, while the path is in the testing state. In various embodiments, the instruction may be conveyed via an OAM packet that is encapsulated using a header that supports SFC. For example, the instruction may be included in a packet that is encapsulated using an NSH header. The self-assessment instruction may cause a receiving node along the path to perform a security assessment, a health assessment, or otherwise report on the operational or configuration status of the node back to the requester. For example, the assessment instruction may be an OVAL-based instruction, in one embodiment. However, other assessment mechanisms may be used, in other embodiments.

At step 820, the device may analyze the self-assessment results returned from the nodes along the tested path, as described in greater detail above. In various cases, the nodes may return either a PASS or FAIL assessment response, indicating whether or not the nodes passed or failed the self-assessments. In other cases, the nodes may return other information regarding their operational states, allowing the device to make the individual assessments. For example, the nodes may alternatively provide information regarding their software configurations (e.g., OS version, installed patches, etc.), thereby allowing the device to determine whether any given node is trustworthy and/or healthy. In further embodiments, a node may return an UNKNOWN assessment response, if the node was unable to process the assessment instruction. In such a case, the device may determine whether or not the path is cleared for use by user traffic based on the results from the other nodes in the path, the type of user traffic (e.g., the path may still be acceptable for use by lower-priority traffic), or other such factors.

At step 825, at detailed above, the device may adjust the state of the path based on the analysis of the self-assessment results reported by the nodes. Notably, if the device determines that all of the nodes along the path have passed their self-assessments, the device may adjust the state of the path to be 'active,' thereby enabling the path to convey user traffic. However, if the device determines that one or more nodes along the path failed their self-assessments and/or if one or more nodes were unable to process the assessment instruction, the device may place the path in an 'inactive' state, until the node is repaired. Procedure 800 then ends at step 830.

It should be noted that while certain steps within procedure 800 may be optional as described above, the steps shown in FIG. Bare merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, improve upon the functioning of the networking devices in an SFC system by ensuring that only healthy SFPs/RSPs (e.g., those free from known defects, security vulnerabilities, etc.) are allowed to convey user traffic in the network. By periodically checking the paths against known issues, a consistent level of confidence can be maintained that user traffic will continue to pass uninterrupted. In addition, because tests are performed in line within the SFC dataplane protocol and NSH, the exact nodes involved in a specific service path are tested. The techniques herein are also extensible, allowing any time of test to be supported by the nodes, provided the nodes understand the test format.

While there have been shown and described illustrative embodiments that ensure the health of SFPs/RSPs, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   placing into a testing state, by a device in a network, a path of nodes in a computer network that a service function chain traverses;
   causing, by the device, a self-assessment instruction to be propagated along the path while the path is in the testing state, wherein the self-assessment instruction instructs each node along the path to perform a security posture assessment and a health assessment;
   analyzing, by the device, self-assessment results from each of the nodes along the path to determine whether the path is secure and healthy; and adjusting, by the device, a state of the path based on the analyzed self-assessment results, wherein adjusting includes:
placing, by the device, the path into an inactive state, in response to a determination that the security posture assessment indicates that one or more of the nodes along the path failed the security posture assessment or a determination that the path is not healthy, wherein in the inactive state traffic is not allowed to traverse the path, and
placing, by the device, the path into an active state, in response to at least a determination that each of the nodes along the path passes both the security assessment and the health assessment;
wherein the self-assessment instruction is an Open Vulnerability Assessment Language (OVAL)-based instruction.

2. The method as in claim 1, wherein the self-assessment instruction is encapsulated in a network service header (NSH).

3. The method as in claim 1, further comprising:
receiving, at the device, the self-assessment results from the nodes.

4. The method as in claim 3, wherein the received self-assessment results indicate that a particular node along the path could not process the self-assessment instruction.

5. The method as in claim 1, wherein the OVAL-based instruction is compressed using text compression or binary encoding.

6. An apparatus, comprising:
one or more network interfaces to communicate with a network;
a processor coupled to the network interfaces and configured to execute one or more processes; and
a memory configured to store a process executable by the processor, the process when executed operable to:
place into a testing state a path of nodes in a computer network that a service function chain traverses;
cause a self-assessment instruction to be propagated along the path while the path is in the testing state, wherein the self-assessment instruction instructs each node along the path to perform a security posture assessment and a health assessment;
analyze self-assessment results from each of the nodes along the path to determine whether the path is secure and healthy; and
adjust a state of the path based on the analyzed self-assessment results, wherein adjusting includes:
placing the path into an inactive state, in response to a determination that the security posture assessment indicates that one or more of the nodes along the path failed the security posture assessment or a determination that the path is not healthy, wherein in the inactive state traffic is not allowed to traverse the path, and
placing the path into an active state, in response to at least determination that each of the nodes along the path passes both the security assessment and the health assessments;
wherein the self-assessment instruction is an Open Vulnerability Assessment Language (OVAL)-based instruction.

7. The apparatus as in claim 6, wherein the self-assessment instruction is encapsulated in a network service header (NSH).

8. The apparatus as in claim 6, wherein the process when executed is further operable to:
receive the self-assessment results from the nodes.

9. The apparatus as in claim 8, wherein the received self-assessment results indicate that a particular node along the path could not process the self-assessment instruction.

10. The apparatus as in claim 6 wherein the OVAL-based instruction is compressed using text compression or binary encoding.

11. A tangible, non-transitory, computer-readable media having software encoded thereon, the software when executed by a processor operable to:
place into a testing state a path of nodes in a computer network that a service function chain traverses;
cause a self-assessment instruction to be propagated along the path while the path is in the testing state, wherein the self-assessment instruction instructs each node along the path to perform a security posture assessment and a health assessment;
analyze self-assessment results from each of the nodes along the path to determine whether the path is secure and healthy; and
adjust a state of the path based on the analyzed self-assessment results, wherein adjusting includes:
placing the path into an inactive state, in response to a determination that the security posture assessment indicates that one or more of the nodes along the path failed the security posture assessment or a determination that the path is not healthy, wherein in the inactive state traffic is not allowed to traverse the path, and
placing the path into an active state, in response to at least a determination that each of the nodes along the path passes both the security assessment and the health assessments;
wherein the self-assessment instruction is an Open Vulnerability Assessment Language (OVAL)-based instruction.

12. The computer-readable media as in claim 11, wherein the self-assessment instruction is encapsulated in a network service header (NSH).

* * * * *

UNITED STATES PATENT AND TRADEMARK OFFICE
CERTIFICATE OF CORRECTION

| | | |
|---|---|---|
| PATENT NO. | : 10,374,922 B2 | Page 1 of 1 |
| APPLICATION NO. | : 15/051809 | |
| DATED | : August 6, 2019 | |
| INVENTOR(S) | : Gonzalo Salgueiro et al. | |

It is certified that error appears in the above-identified patent and that said Letters Patent is hereby corrected as shown below:

In the Specification

Column 12, Line 13, please amend as shown:
shown in FIG. 8 are merely examples for illustration, and In the Claims Column 14, Line 4, please amend as shown:
the health assessment;

Column 14, Line 47, please amend as shown:
health assessment;

Signed and Sealed this
Twenty-first Day of July, 2020

Andrei Iancu
*Director of the United States Patent and Trademark Office*